June 24, 1958 R. A. WEBSTER 2,839,917
HARDNESS TESTING MACHINE
Filed Oct. 4, 1955 2 Sheets-Sheet 1

INVENTOR.
ROBERT A. WEBSTER
BY Elliott & Pastoriza
ATTORNEYS

June 24, 1958  R. A. WEBSTER  2,839,917
HARDNESS TESTING MACHINE
Filed Oct. 4, 1955  2 Sheets-Sheet 2

INVENTOR.
ROBERT A. WEBSTER
BY Elliott & Pastoriza
ATTORNEYS

United States Patent Office 2,839,917
Patented June 24, 1958

2,839,917

HARDNESS TESTING MACHINE

Robert A. Webster, Santa Monica, Calif., assignor to Webster Instrument, Inc., a corporation of California Application October 4, 1955, Serial No. 538,322

10 Claims. (Cl. 73—81)

This invention relates generally to hardness testing machines and more particularly, to an improved machine in which an index to the hardness of a specimen is provided by continuously indicating both the load applied to a penetrator and its depth of penetration into the specimen.

Conventional hardness testing machines indicate the hardness of a metal or other material by the depth of penetration achieved by a penetrator under a given load or force. This depth serves as a numerical index to the hardness of the material. In certain instances, other physical dimensions of an impression, such as its diameter serve to indicate the hardness of the material. Alternatively, a numerical index to the hardness may be provided by measuring the load or force necessary to effect a given known depth of penetration.

Regardless of the type of machine used, in testing specimens for hardness, several readings or measurements are usually taken on a single specimen. Any variations between such readings are generally accountable to inaccuracies in the testing machine itself rather than to inhomogeneities in the specimen. In other words, friction, initial impacts between the penetrator and specimen, and environmental vibrations transmitted through the testing machine supports, all contribute towards the inability of the machine to yield consistent readings. As a result of these difficulties, hardness values for specific materials are given as a numerical range varying between the lowest and highest readings obtained on any one specimen. The numerical differences between the lower and higher numbers in the range are oftentimes sufficient to cause an overlapping of ranges for materials of similar hardness, whereby a differentiation between such materials is extremely difficult.

Bearing the above in mind, it is a primary object of the present invention to provide a greatly improved hardness testing machine in which friction, initial impacts, outside vibrations, and other environmental factors inherent in present day machines, are greatly reduced whereby a far more sensitive and accurate machine is provided.

Another important object is to provide a hardness testing apparatus employing a penetrating means in which both the load necessary to achieve a given penetration and the penetration resulting from a given load may be indicated as a hardness index so that an expanded scale or large numerical difference may be established by the proper choice of the index in order to distinguish between the specimens of nearly the same hardness.

A further important object of this invention is to provide a machine in which the behavior of metals may be observed by providing a simultaneous indication of the load applied to a penetrator and the corresponding depth achieved by the penetrator. Thus, it is possible to measure the depth of penetration while the load is applied to the specimen and it is further possible to observe and measure any springback in the specimen as a result of relieving the load. An additional practical consequence of this object resides in the provision of a testing machine enabling hardness readings on extremely thin materials without exceeding a given penetration.

Another object of the invention is to provide a hardness testing machine which is sufficiently sensitive to enable hardness tests to be made directly on a material without damage to the material surface.

Still another object is to provide a hardness testing machine which may be remotely operated.

These and many other objects and advantages of the present invention are attained by providing a frame structure having two spaced, opposed portions. A penetrating means is positioned between these portions and adapted to engage a specimen held by one of the portions. Between the penetrating means and the other portion there is provided an expandable mechanism adapted to apply a load between the penetrating means and the other of said portions whereby the penetrating means is urged to a depth in the specimen. Indicating means are associated with each of the portions respectively for simultaneously yielding an indication of the depth of penetration and the applied load. Preferably, these indicating means include electro-mechanical transducing devices which are extremely sensitive to minute changes in position of an element.

The expandable mechanism preferably comprises an air chamber having a diaphragm movable under pressure against the penetrating means and the other of said frame portions, whereby a load or force is provided tending to separate this other portion and the penetrator. This other portion preferably constitutes a bending beam cantilevered to the frame so that the movement of this beam under the load or pressure from the diaphragm may be indicated by the electro-mechanical transducer. Air pressure to the air chamber may be provided through an elongated flexible tube from a position remote from the apparatus. With this arrangement, the apparatus may be operated with substantially no friction and no impact loading. Further, since no weights or masses are employed for providing the load forces, outside or environmental vibrations will be of little consequence. In other words, no large inertial masses that may cause a "working" of the penetrator into the material as a result of vibrations are present.

A better understanding of the invention will be had by referring to a preferred embodiment thereof as illustrated in the accompanying drawings, in which.

Figure 1:
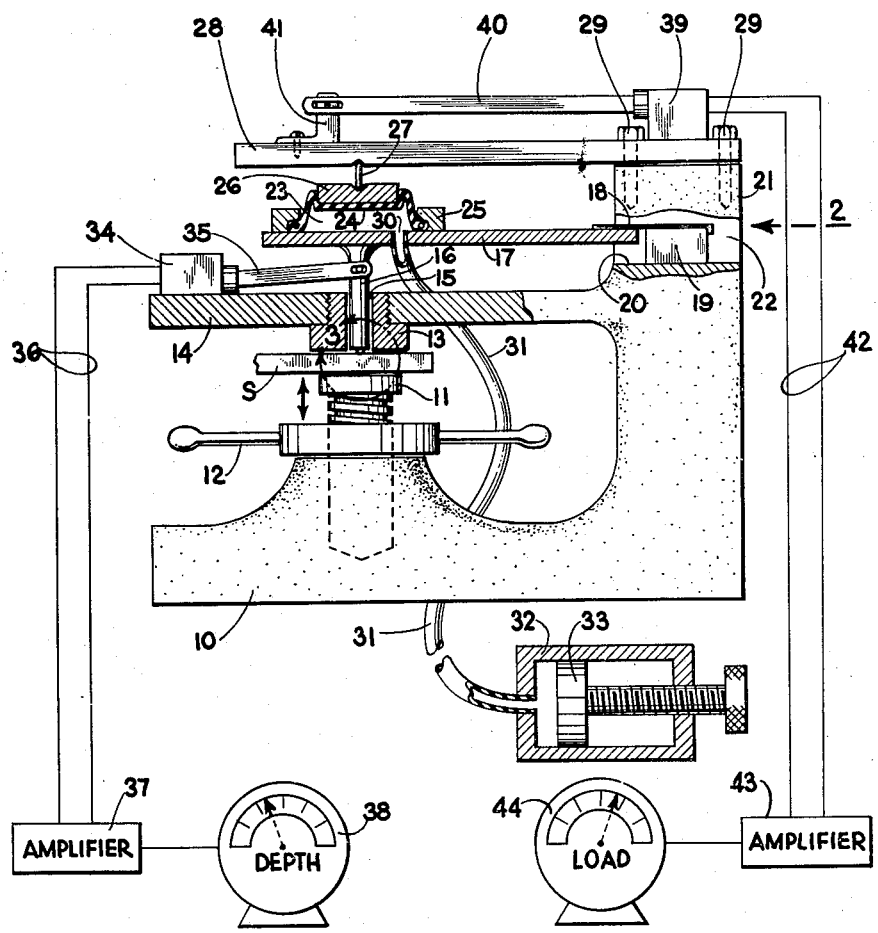
Figure 1 is an elevational view partly in cross section and partly schematic showing a preferred embodiment of the hardness testing machine.

Referring to Figure 1, there is shown a frame 10 including a first portion toward the center of the drawing comprising a press plate 11 threaded into the frame 10 and adapted to be raised or lowered by a handle 12. Co-operating with the press plate 11 for holding a specimen S to be tested, is an anvil insert 13 threaded within an anvil support 14 comprising an integral portion of the frame 10 as shown. With this arrangement, the press plate 11 may be vertically raised or lowered as indicated by the two headed arrow, to hold the specimen of metal S flush against the bottom surface of the anvil insert 13 in accordance with the thickness of the specimen.

Figure 2:
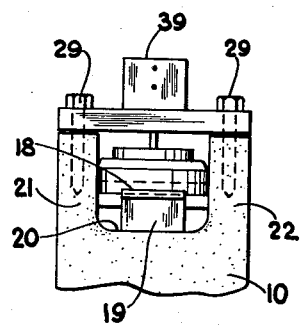
Figure 2 is a rear view of a portion of the apparatus taken in the direction of the arrow 2 of Figure 1.

The anvil 13 includes a central bore 15 arranged to co-operate with a penetrating means comprising a penetrator 16 vertically movable through the bore 15. The penetrator 16 is rigidly secured to a supporting member 17 in turn hinged by a leaf hinge 18 to a block 19 secured to the frame 10. As shown more clearly in Figure 2, the block 19 is secured to a horizontal portion 20 of the frame, the frame itself dividing into two upstanding portions 21 and 22 on either side of the block. The leaf hinge 18 is extremely flexible so that the support member 17 and penetrator 16 are merely positioned for free movement through the bore 15 with a minimum of friction.

For applying a load to the penetrator, there is provided an expandable means in the form of an air chamber 23 defined by the upper surface of a portion of the support member 17 and a flexible diaphragm 24 sealed to the upper surface by an annular undercut element 25. On the upper side of the diaphragm 24 is positioned a guide block 26 serving to transmit pressure within the air chamber 23 through a knife-edged transmitting element 27 against a bending beam 28. The element 27 and bending beam 28 constitute a second portion of the frame structure 10, and as shown, take the form of a cantilevered structure, the fixed end of the cantilevered beam 28 being rigidly secured to the frame portions 21 and 22 by bolts 29.

Pressure is supplied to the air chamber 23 through an opening 30 in the chamber communicating with a flexible tube 31. The tube 31 passes to a remote location, if desired, and terminates in an air cylinder 32 provided with a movable piston 33. By moving the piston 33 through the cylinder 32, fluid or air is urged through the tube 31 into the chamber 23 to expand the same and apply a load to the penetrator 16. This same load or force is simultaneously applied through the transmitting element 27 to the bending beam 28 tending to bend this beam upwardly.

An electrical transducer 34 is associated with the first portion of the frame 10 and, as shown, is secured to the anvil support 14 and provided with an actuating element 35 coupled to the penetrator 16. Vertical movement of the penetrator will arcuately swing the actuator 35 and thereby vary the electrical output of the transducer 34. The output of transducer 34 is passed through a pair of leads 36 to an amplifier 37 and then passed to a meter 38 which may be calibrated to read the movement of the penetrator and thus the depth of penetration, in thousandths of an inch.

A second electrical transducer means 39 for indicating the load applied by the bending beam 28 through the medium of the pressure chamber 23 is secured to the fixed end of the bending beam 28. The transducer 39 has an actuating element 40, extending generally parallel to the bending beam 28, and positioned for actuation in response to the movement of the free end of the beam as through a bracket 41. Bending of the beam as determined by the load applied by the expandable means will thus move the actuating element 40 to provide an electrical signal proportional to such movement. This signal is passed through a pair of leads 42 through an amplifier 43 and thence to a load indicating meter 44 which may be calibrated in pounds or kilograms.

Figure 3:
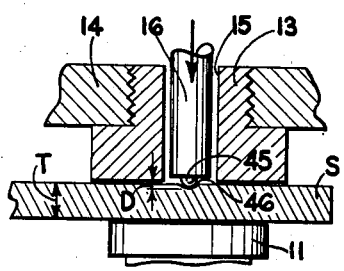
Figure 3 is an enlarged view of a portion of the penetrating means enclosed in the circular arrow 3 of Figure 1.

Referring to the enlarged view of Figure 3, the penetrator 16 is shown as including a hemispherical ball 45 at its lower end adapted to be urged into the specimen S to any arbitrary depth D to make an impression 46 in the specimen. It will be appreciated, however, that other conventional penetrator ends might be employed instead of the ball 45, for example, diamond, conical, and pyramid shaped tips. Conventionally, the penetration depth D, as a result of any load L, should not be greater than about ten percent of the thickness T of the specimen.

In operation, the press plate 11 is backed down by rotating the handle 12 in a clockwise direction as viewed from the top, and a specimen, the hardness of which is to be tested, inserted between the press plate and the anvil insert 13. The handle 12 is then rotated in a counter-clockwise direction to raise the press plate 11 into engagement with the undersurface of the specimen S to hold it in flush engagement with the undersurface of the anvil insert 13. By opening the chamber 23 to the atmosphere, as by a relief valve in the tube 31 (not shown), the penetrator 16 will be free to move vertically within the bore 15 with substantially no load and it will, therefore, come to rest when the point of engagement of the penetrating hemispherical ball 45 is in the plane of the surface of the anvil insert 13 and the upper surface of the specimen S. A minor load may now be applied to the penetrator 16 by simply moving the piston 33 in the cylinder 32 to force air into the air chamber 23. This minor load may be read from the load meter 44 and when attained, the penetration depth meter 38 may be set to zero.

The piston 33 may then be gradually moved in the cylinder 32 to gradually increase the pressure within the chamber 23. Expansion of the chamber 23 urges the bending beam 28 and penetrator 16 in opposite directions whereby the penetrator 16 will commence to move into the specimen S. This degree of movement will be precisely indicated by the transducer 34 and penetration depth meter 38 inasmuch as the transducer 34 is rigidly positioned with respect to the anvil support member 14 and anvil insert 13, and movement of the penetrator 16 is relative to these rigid portions. Correspondingly, the penetrator load or force will be accurately indicated by the load meter 44 inasmuch as after the minor load has been established, a further load will result in a further bending of the bending beam 28. The transducer 39 is rigidly secured to the bending beam at its fixed end and, therefore, movement of the free end of the beam 28 will be precisely indicated.

Readings may then be taken from either one or both of the meters 38 and 44 depending upon the particular numerical index to hardness that has been selected. After a reading has been taken, the load is relieved and the specimen removed by lowering the press plate 11. The specimen may then be repositioned for a second reading or a new specimen to be compared with the first specimen inserted.

The use of an air pressure chamber 23 and the piston cylinder arrangement 33 and 32 provide a very sensitive means for increasing or decreasing the load. It should also be noted that the actual movement of the penetrator support member 17 is no greater than the penetration within the specimen S and, therefore, movement of the hinge 18 serving to position the member 17 is extremely slight and any friction involved at this point is negligible.

Figure 4:
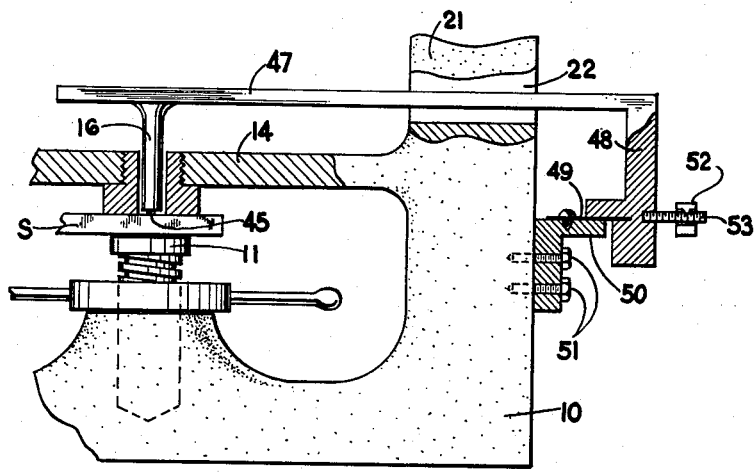
Figure 4 is an elevational view of a modification of the penetrator supporting member.

Ordinarily, the mass of the penetrator 16 and supporting member 17 are negligible, but to insure true static and dynamic balancing against outside vibrations, the support member 17, hinge 18, and block 19 may be replaced with the modified penetrator support means shown in Figure 4. In this construction a support member 47 terminates at its inner end in an elongated block 48 extending downwardly beyond the horizontal portion 20 of the frame 10. This block 48 is secured to a leaf hinge 49, at a point substantially at the same vertical level as the ball 45 of the penetrator 16. The leaf hinge 49 is in turn coupled to a member 50 secured as by bolts 51 to the frame 10.

With this type of penetrator support means, arcuate movement of the penetrator 16 with respect to the hinge 49 will be reduced to a minimum. In addition, the block 48 may be used as a counterweight means to statically and dynamically balance the weight of the penetrator 16 and the support member 47 about the hinge point 49. In this respect, accurate counterweight adjustments may be made by incorporating a weight 52 whose position may be adjusted on the screw 53 with respect to the hinge 49.

Further, the block 48 extends below the hinge 19 so that the hinge point corresponds to the center of gravity of the system. By providing counterweight means, any weight load inherent in the mass of the support member 47 and penetrator 16 is statically and dynamically equalized, whereby the penetrator 16 may be set to rest substantially freely on the specimen at the time tests are commenced.

Because both the penetration and load are simultaneously indicated, the hardness testing machine of this invention is highly versatile. For example, if the specimen S were extremely soft, a relatively accurate indication of the hardness would best be obtained by measuring the depth of penetration attained under a given known load, since this depth, numerically indicated, would be large compared to the load. On the other hand, if the specimen were quite hard, a greater numerical difference for providing an index to the hardness would be provided by reading the load necessary to attain a given depth, since the load would be large for a small penetration depth. Thus, the combination of the two meters for providing readings enables a numerical expansion of the hardness index scale to be achieved. In other words, the index to hardness, either depth of penetration or load, which shows the greatest numerical difference between specimens of nearly similar hardness would be used.

As a result of the use of two scales, a numerical index more nearly approaching the "true hardness" of a specimen may be indicated. That is, large numerical differences in hardness readings can be obtained between two specimens of nearly similar hardness by employing the proper combination of readings between the penetration and load scales. For these same reasons, a much more accurate indication of the hardness of a single specimen may be obtained in that for a given shaped penetrator, such as the hemispherical penetrator 45 shown in Figure 3, the change in depth of the penetration with increased load will be relatively large for small loads whereas the rate of change will be relatively small for large loads. This rate of change variation occurs because the contact area of the hemispherical ball 45 increases with greater penetration. Therefore, where a very thin specimen is to be tested in which the penetration must necessarily be kept to a minimum, the load scale will give the largest numerical difference between various tests on the same specimen, whereas in the event that the depth of penetration can be made relatively deep, such as would be the case with a thick specimen S, the penetration scale would be used to provide a large numerical difference. The machine is, therefore, very useful for making direct tests on materials with a minimum of surface damage.

It will also be appreciated that certain behavior characteristics of metals, such as its cold working properties, may be observed by means of the present apparatus. For example, the rate of change of the penetration with load or the rate of change of load with penetration may be observed throughout the operation as the load is gradually increased. Further, after a given penetration has been attained, the load may be relieved and the springback in the material observed. In other words, the actual penetration depth may be measured both while the load is applied and after the load has been relieved, by simply reading the penetration depth scale.

Still another feature of the present invention resides in the method of applying the load through the air chamber 23. By this method, the load may be applied from a remote location whereby the machine may be isolated from environmental factors which may cause inaccuracies in the readings. Further, it will be noted that initial impacts of the penetrator against the specimen as well as vibrations, are avoided in the present machine in view of the use of the air chamber 23, which enables the load to be very gradually applied and does not provide any significant inertial mass which could cause a "working in" of the penetrator as a result of external vibrations. It should be understood that while an air chamber has been described, it is possible to employ other hydraulic fluids should such be desirable for certain applications.

From the above description it will be appreciated that the present invention provides an extremely accurate and sensitive hardness indicating machine in which friction is substantially eliminated not only by use of an air chamber for applying the load, but additionally by the use of the leaf hinge for positioning the penetrator means and by the use of electrical transducers, which are extremely sensitive and are not required to generate large signals in view of the use of amplifiers. Finally, the feature of dual meters for simultaneously measuring both hardness and penetration enables expansion of an index scale to be attained wherein large numerical differences may be tabulated as indices of the hardness of specimens of similar characteristics. Thus, the range of hardness for any given material may be substantially reduced and an indication approaching the "true hardness" of the material is provided.

Various modifications of the present apparatus falling within the scope and spirit of this invention will occur to those skilled in the art. The invention, therefore, is not to be thought of as limited to the specific structure shown and described for illustrative purposes.

What is claimed is:

1. A hardness testing machine comprising, in combination: a frame including a projecting portion adapted to hold a specimen; a cantilevered beam secured at its fixed end to said frame and having its free end in opposed, spaced relationship to said portion; penetrating means positioned to engage said specimen; expandable means positioned between said penetrating means and said free end of said cantilevered beam for applying a force between said penetrating means and said beam; and means operatively coupled to said cantilevered beam and responsive to movement of said free end of said cantilevered beam upon application of said force, for providing an indication of said force.

2. A hardness testing machine comprising, in combination: a frame including a first portion and a second portion in opposed, spaced relationship, said first portion being adapted to hold a specimen and said second portion being adapted to physically move under a load; penetrating means positioned between said specimen and said second portion; expandable means positioned between said penetrating means and said second portion; means for actuating said expandable means to urge said penetrating means to a depth in said specimen and to move said second portion in an opposite direction by applying a load between said penetrating means and said second portion; means operatively coupled to said penetrating means and responsive to movement thereof for indicating said depth; and means operatively coupled to said second portion and responsive to movement thereof for indicating said load.

3. A machine according to claim 2, in which said second portion comprises a cantilevered beam having its fixed end secured to said frame and its free end positioned adjacent said expandable means, whereby actuation of said expandable means applies a bending force to said beam.

4. A machine according to claim 3, in which said expandable means comprises a pressure chamber and said means for actuating said expandable means comprises a flexible conduit for passing fluid into said chamber from a remote location.

5. A machine according to claim 4, in which said penetrating means includes a penetrator; a supporting member to which said penetrator is rigidly secured; and a flexible hinge coupling said supporting member to said frame.

6. A machine according to claim 5, in which said means operatively coupled to said penetrating means for indicating said depth and said means operatively coupled to said second portion for indicating said load, comprise electrical transducers having actuating elements connected to said penetrator and the free end of said beam, respectively, adapted to generate signals in response to movement of said penetrator and beam respectively; amplifiers respectively connected to each of said transducers for amplifying said signals; and meter means connected to each of said amplifiers for indicating said signals.

7. A hardness testing machine comprising, in combination: a frame; a press plate on said frame adapted to engage the bottom surface of a specimen; an anvil rigidly secured to said frame and adapted to engage the top surface of said specimen, whereby said specimen is held between said press plate and anvil, said anvil having a central bore; a penetrator positioned for axial movement through said bore to engage said specimen; a supporting member secured to said penetrator; flexible hinge means connecting said supporting member to said frame; an expandable pressure chamber secured to said supporting member; a cantilevered beam having its fixed end rigidly secured to said frame and its free end positioned so that said pressure chamber lies between said free end and said supporting member; means for forcing fluid into said chamber to expand said chamber against said beam and urge said penetrator through said bore into said specimen; means responsive to bending of said beam for indicating the load applied to said penetrator by said pressure chamber; and means responsive to movement of said penetrator through said bore for indicating the depth of penetration of said penetrator into said specimen.

8. A machine according to claim 7, in which said means responsive to bending of said beam comprises an electrical transducer secured to the fixed end of said beam and having an actuating element coupled to the free end of said beam, and amplifying means connected to said transducer for amplifying a signal generated thereby, the magnitude of said signal being an indication of the bending of said beam; and in which said means responsive to movement of said penetrator comprises an electrical transducer secured in rigid relationship with respect to said anvil and having an actuating element secured to said penetrator whereby an electrical signal is generated by said transducer in response to movement of said penetrator, and amplifier means connected to said last mentioned transducer for amplifying said electrical signal, the magnitude of said electrical signal providing an indication of the movement of said penetrator.

9. A machine according to claim 8, in which said means for forcing fluid into said chamber to expand said chamber comprises an elongated tube communicating with said chamber for passing said fluid into the chamber; and manual means connected to the far end of said tube for gradually urging said fluid through said tube into said chamber and for gradually withdrawing fluid from said chamber through said tube, whereby the load on said penetrator may be gradually increased and gradually decreased from a location remote from said machine.

10. A machine according to claim 7, including means for statically and dynamically balancing said supporting member and penetrator with respect to said hinge means.

References Cited in the file of this patent

UNITED STATES PATENTS

| | | |
|---|---|---|
| 1,192,670 | Moore et al. | July 25, 1916 |
| 1,320,748 | Fisher | Nov. 4, 1919 |
| 1,874,780 | McGuckin | Aug. 30, 1932 |
| 2,677,271 | Faris et al. | May 4, 1954 |

FOREIGN PATENTS

| | | |
|---|---|---|
| 714,164 | Great Britain | Aug. 25, 1954 |